Figure 1:
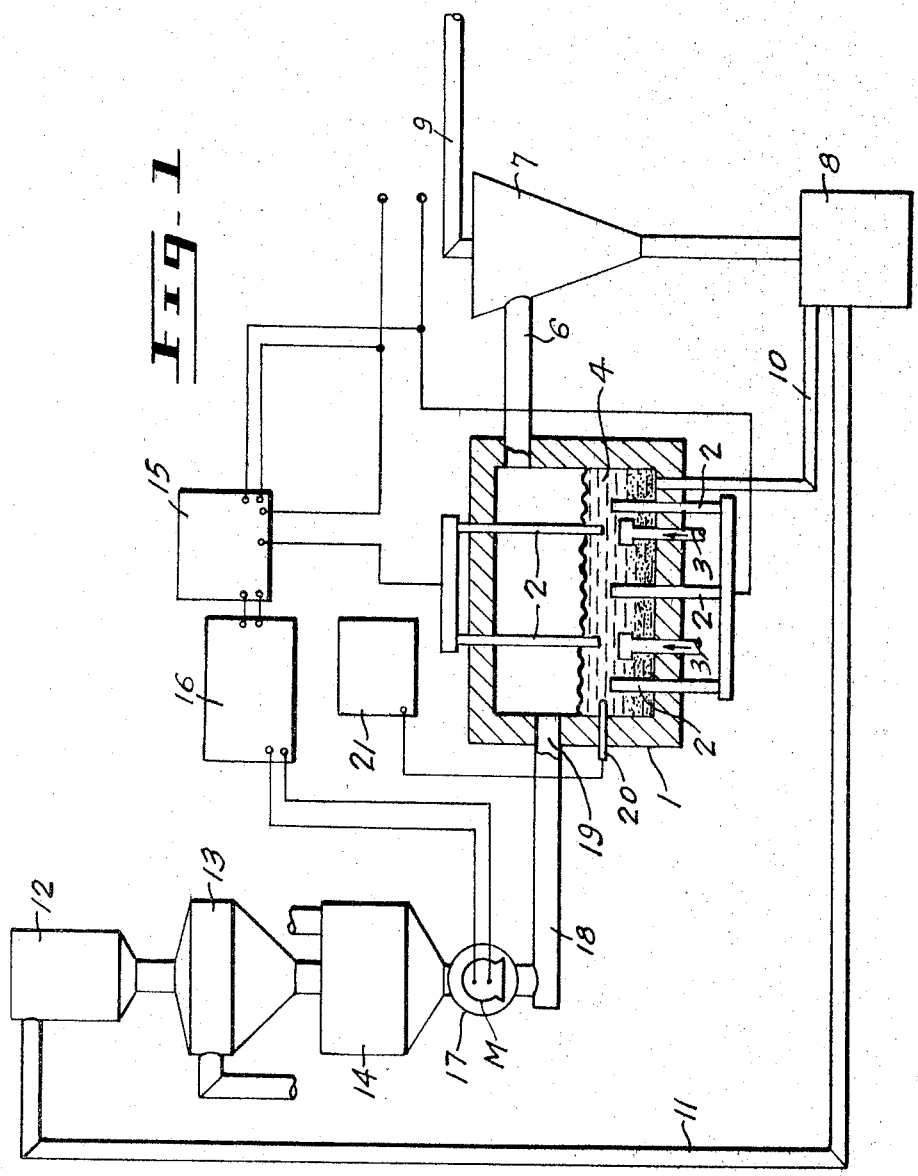

Feb. 21, 1967    N. B. SHINE ETAL    3,305,661
OPERATION OF ELECTRICALLY HEATED FLUIDIZED BEDS
Filed Feb. 3, 1964    3 Sheets-Sheet 3

INVENTORS
*N.B.* SHINE & D. J. KENNEDY, DECEASED
BY.    D. V. KENNEDY, EXECUTRIX

BY: *Heatley and Morrison*
AGENTS

United States Patent Office 3,305,661
Patented Feb. 21, 1967

3,305,661
OPERATION OF ELECTRICALLY HEATED FLUIDIZED BEDS
Noel Brendan Shine, Shawinigan South, Quebec, Canada, and Douglas Joseph Kennedy, deceased, late of Shawinigan, Quebec, Canada, by Dorothy Verna Kennedy, executrix, Shawinigan, Quebec, Canada, assignors to Shawinigan Chemicals Limited, Montreal, Quebec, Canada, a corporation of Canada
Filed Feb. 3, 1964, Ser. No. 342,858
15 Claims. (Cl. 219—50)

This invention relates to a method and apparatus for controlling power consumption in electrically-heated fluidized beds. It also relates to a method and apparatus for controlling temperature in electrically-heated fluidized beds, especially those which normally operate at high temperatures, at which normal temperature control methods are inadequate.

Electrically heated fluidized beds of electrically conductive carbon particles are known in the art. Examples of such beds are shown in Johnson et al., U.S. Patents 2,948,587 and 3,009,781, dated August 9, 1960, and November 21, 1961, respectively. They can be used in many different chemical processes, for example the production of hydrogen cyanide, carbon disulphide, titanium tetrachloride and other valuable chemicals. Many of these processes require high temperatures, for example temperatures above 1000° C. In many of them as well, these temperatures must be rigidly controlled.

In the past, the most common method of controlling power consumption and temperature in an electrically heated fluidized bed has been by varying the voltage applied. This is not completely satisfactory, as neither continuous nor sufficiently accurate control is possible with a stepwise voltage regulator, and continuously variable or stepless regulators capable of handling the load requirements of an electrically heated bed in a high temperature commercial process are not economically feasible. Certain types of stepless voltage regulators can also introduce undesirable harmonic effects in the voltage.

Another variable factor, the rate of input of fluidizing gas, has also been extensively examined as a means of temperature control. It has been found that changes in the bed temperature can be obtained by variation in the rate of gas flow, within certain ranges of fluidization. However, this method is extremely unpredictable and offers at best a narrow range of temperature control. Additionally, it is frequently undesirable to alter the amount of gas entering the bed in processes where the fluidizing gases are reactants, as a change in gas feed rates involves a change in amounts of reactants and hence a change in the amount of products. If the heat of the reaction is at all appreciable, changing the amount of reactants fed will cause a considerable change in the heat balance, which change may tend to cancel any temperature control obtained by varying fluidization rates.

The present invention provides a method of temperature control for electrically heated fluidized beds of electrically conductive carbon particles, which method does not have the disadvantages inherent in control by variation of the applied voltage or the fluidization rate. In a preferred embodiment, the invention provides a method of temperature control in which temperature is not measured directly, and the difficulties of measuring high temperatures are thus avoided.

Apparatus for carrying out the above methods is also provided by the invention.

The invention consists in a method of controlling the temperature and power consumption of a fluidized bed of electrically-conductive carbon particles, which bed is heated by the passage of an electric current therethrough, which comprises measuring one parameter from the group consisting of bed temperature and bed power consumption, said power consumption being averaged over a period of at least ten seconds, and adjusting the amount of carbon particles in the bed responsively to deviations of the value of the measured parameter from a desired value, so that the amount of carbon particles in the bed is increased when the value of the measured parameter is below the desired value, and the amount of carbon particles in the bed is decreased when the value of the measured parameter is above the desired value.

The invention also includes apparatus useful for temperature control in a fluidized bed of the character described comprising means for changing the amount of carbon particles in the bed responsive to changes in the measured temperature or averaged power consumption.

The drawings show temperature control apparatus embodying the principle of the invention, as they are applied to a hydrogen cyanide furnace of the type described in Kennedy et al., United States Patent 3,032,396, issued May 1, 1962. FIGURE 1 shows apparatus which controls responsively to the measured averaged power consumption while FIGURE 2 shows apparatus which controls responsively to the measured temperature.

Referring now to FIGURE 1, 1 is a fluid bed reactor similar to that described in the Kennedy et al. patent, with electrodes 2, gas inlet means 3, and a bed of electrically conductive carbon particles 4. Gas containing entrained carbon particles leaves the bed through line 6 and passes to cyclone separator 7, from which the carbon particles fall down into storage bin 8, while the carbon-free gases pass out through line 9 for product separation and processing. An alternative method of removing carbon particles from the bed is the draw-off pipe 10, which connects the lower portion of the bed 4 to the storage bin 8. Any other known method of removing carbon particles from the bed may also be used. From time to time the carbon particles in bin 8 are transferred to bin 12 by suitable conveyor means 11. From bin 12 the particles are passed through a vibrating screen 13 to remove large sized particles. Those particles which pass through the screen fall into storage bin 14. From time to time, fresh carbon particles are added to bin 14, to compensate for those particles removed by screen 13 and to provide for control situations where more carbon is temporarily put into the bed than is removed.

A kilowatt meter 15 is connected to measure the power consumed in the fluidized bed and is suitably adjusted to give a signal corresponding to the power consumed over a definite period of time. The signal from this kilowatt meter is fed into a controller 16. This controller is used to control pneumatically the speed of a star feeder 17 so that when the power consumption in the bed increases the star feeder decreases its rate of feed, and when the power consumption decreases, the star feeder increases its rate of feed. This star feeder takes coke from the storage bin 14 and transfers it through a line 18 to the reactor, discharging into the reactor through an opening 19 in the wall. A thermocouple 20, suitably shielded, is placed in the bed. It is connected to a temperature recorder 21. The temperature record is from time to time visually compared with the record of averaged power consumption obtained from controller 16, in order to insure that no abnormal conditions have hindered control. In the particular hydrogen cyanide process described, it is desirable to allow no oxygen into the reaction zone. An inert atmosphere is therefore maintained in all vessels connecting directly with the fluidized bed reactor by means not shown in the drawing.

Figure 2:
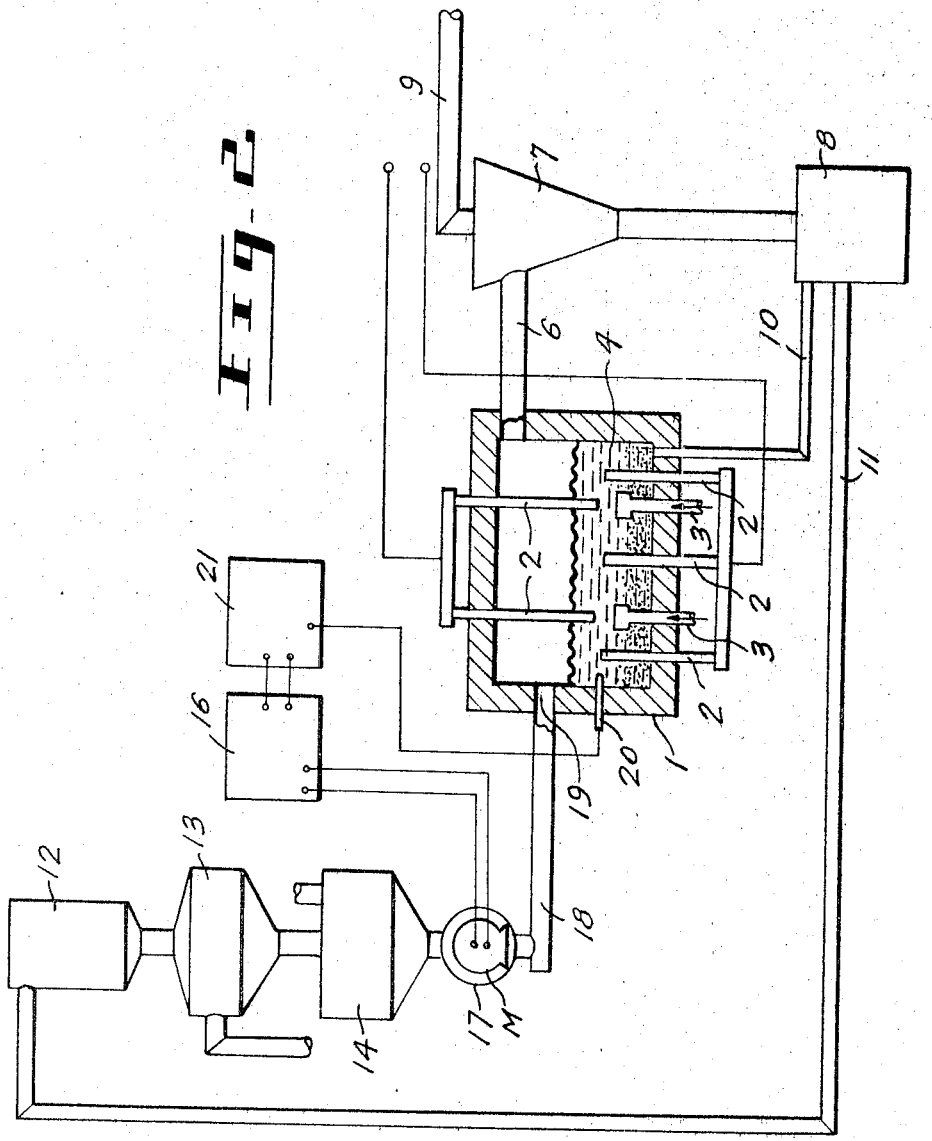

The apparatus shown in FIGURE 2 is in most respects similar to that of FIGURE 1, except that the kilowatt meter 15 is dispensed with. Instead, the signal from the temperature recorder 21 is fed into the controller 16, which controls the star feeder 17. The amount of carbon particles in the bed is thus adjusted in this embodiment responsively to temperature changes.

As can be seen from the description above, temperature can be controlled according to the method of this invention in response to changes in either the measured temperature or the measured averaged power consumption. There is a relationship between power consumption and temperature in a fluidized bed of the type herein described, which depends upon several factors, such as the rate of heat loss from the bed to its surroundings, the exothermicity or endothermicity of chemical reactions taking place within the bed, and of course the known laws of energy conversion. This relationship has been found to be fairly constant under normal condition. Thus, either temperature of averaged power consumption can be measured, and the measurements used to control the amount of carbon particles in the bed. An alteration of the amount of carbon particles in the bed causes a change in power consumption, which in turn causes the temperature to change.

When control is exercised responsively to changes in the power consumption of the fluidized bed, it is important that the power consumption be an averaged value over a period of time. The measurement of power cannot be instantaneous, as electrically heated fluidized beds are characterized by short, violent power fluctuations. To smooth these, a suitable averaging kilowatt meter is used, which gives at any instant a reading which is an average of the power measured over a fixed period of time ending with that instant. (The word "power" as used herein has its usual meaning, i.e., volts × amperes in the case of direct current, and volts × amperes × power factor in the case of alternating current.) An average of power consumption over ten seconds is sufficient in most beds to give a reading which can be used for control purposes. In some cases, however, greater damping may be desirable, and much longer averaging periods can be used. In general, it is preferred to average power consumption over a period of thirty seconds to ten minutes, although much longer averaging times are possible. Averaging of the power consumption is necessary regardless of whether the current passed through the bed is alternating or direct.

Generally, it is preferred to vary the amount of carbon particles in response to changes in the measured averaged power consumption rather than changes in the measured temperature. Electrically heated fluidized beds are usually operated at high temperatures, for example at about 600–1600° C., and in this range temperature measurements must be carried out either by shielded thermocouples or by optical pyrometers which are separated from the reactor by thick quartz windows. These methods are not sensitive to small changes in temperature, with the result that temperature changes can reach appreciable magnitudes before detection. However, small changes in the averaged power consumption can easily be detected by a suitable kilowatt meter, long before the corresponding temperature changes have reached a detectable magnitude. Control can thus be more precisely exercised if the averaged power consumption is measured.

If temperature control is exercised by varying the amount of carbon particles in response to the measured averaged power consumption, it is advisable as well to have a temperature measuring device in the bed, and periodically to verify that there are variations in the measured temperature corresponding to any significantly large variations in the measured averaged power consumption. This is because the relationship between temperature and power consumption, although normally constant for small temperature ranges, may be altered by external factors. Examples of such factors are changes in the sensible heat loss of the reactor to its surroundings, pronounced changes in the rate of fluidization or a change from an inert fluidizing gas to a gas which participates in a strongly endo- or exothermic reaction within the fluidized bed. If control is exercised by variation of the amount of carbon in response to temperature variations instead of to variations in measured averaged power, such external factors are automatically compensated for.

In some processes, it may be desired to control the power consumption of a fluidized bed, with the precise temperature obtained being relatively unimportant. In such cases, the amount of carbon particles in the bed can be controlled in response to changes in the averaged power consumption or a related parameter, and comparison of the record of averaged power consumption with the record of the bed temperature is unnecessary.

In general, it is of course preferred to measure the parameter which is being used for control, i.e., the temperature or the power consumption, continuously. However, it is possible to obtain fairly satisfactory control by intermittent measurement of the chosen parameter, with each measurement being followed if necessary by suitable alteration of the amount of carbon particles in the bed to cause the value of the measured parameter to return to the desired value. Such a method of operation is suited to those beds were changes in the temperature and power consumption tend to be relatively slow or of small magnitude.

It is not important how the amount of carbon particles in the bed is adjusted, and many different methods can be used. For example, carbon particles can be removed from the bed by entrainment in the fluidizing gases leaving the bed, by means of a bottom or side draw-off, or by a combination of these methods, and particles can be added either above or below the bed surface. Control can be exercised by holding either the rate of particle removal or return constant, while varying the remaining rate responsively to changes in the measured temperature or averaged power consumption. It is possible of course to vary both rates, but such an expedient leads to unnecessary complication of equipment, and is generally not preferred. Particle removal and addition may be carried out either continuously or intermittently. In most cases it is preferred to remove particles continuously at a constant rate, and to add particles either continuously or intermittently at a variable rate, governing the rate by proportional control methods.

It is also contemplated that the particles added to the fluidized bed in this control method may first be subjected to any desired form of treatment. Thus, in the preferred form of the invention, particles can be removed from the fluidized bed at a constant rate, treated and then returned to the bed at a rate varying with the temperature or averaged power consumption. The treatments to which particles are exposed depend upon the process being carried out in the fluidized bed, and may include size reduction (e.g. by attrition, partial combustion, or the screening out of the larger particles), impregnation with a catalyst, or admixture with non-electrically conductive particles of reactant.

*Example*

The temperature control apparatus shown in FIGURE 1 was applied to a fluidized bed type hydrogen cyanide reactor having a bed containing approximately 2000 pounds of carbon. The kilowatt meter used was a Sangamo type "H" thermal converter, adjusted to give an output varying with the averaged power consumption of the bed over a five-minute period.

The bed was initially fluidized with nitrogen, and a voltage was applied across the electrodes. When the bed had reached the desired temperature range, ammonia, propane and recycled product hydrogen were substituted for the nitrogen, and the endothermic reaction between ammonia and propane to make hydrogen cyanide commenced. When a steady state had been reached, it was found that a power consumption of 1500 kilowatts was necessary to maintain the desired bed temperature reading of about 1350° C.

The control method was therefore set to control the power consumption at 1500 kw. Carbon particles were continuously removed from the bed at a substantially constant rate through line 6 by entrainment in the fluidizing gas. The bottom draw-off pipe 10 shown in FIGURE 1 was not used. Each time that the power consumption of the bed dropped below 1400 kw., the feeder 17 was activated, and delivered carbon particles to the bed at a rate of 40 pounds/hour for a period of three minutes. The reactor was run using only this method of temperature control for seven days, after which it was shut down for a normal maintenance and inspection cycle.

Figure 3:
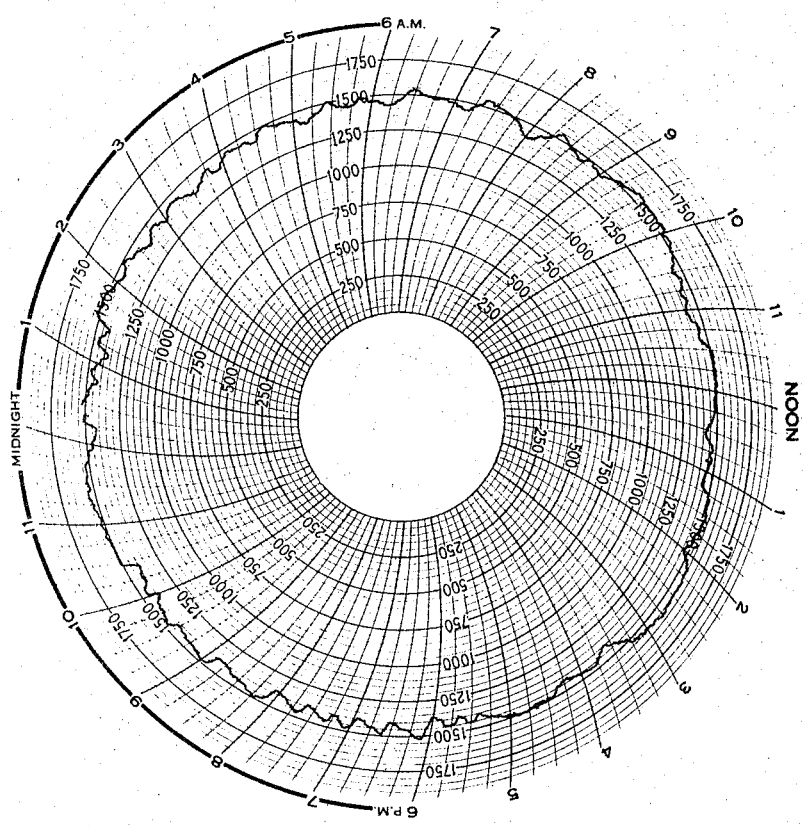

FIGURE 3 shows the record chart of power consumed in the reactor in a 24-hour period, as registerd by the kilowatt meter 15. The chart is directly calibrated in kilowatts. The feeder was activated each time the trace crossed the 1400 kilowatt line in a downward direction. It will be seen from the figure that the result of the feeder activation was a virtually instantaneous upward trend in the power consumtpion of the bed. During the 24-hour period covered by this chart the temperature of the reactor as measured by the thermocouple 20 and recorded on a circular chart remained constant at about 1360° C., with no significant detectable variation.

It is understood that the foregoing embodiments are described only by way of illustration, and that many other modifications may be made without departing from the scope of the invention.

What is claimed is:

1. A method of controlling the temperature and power consumption of a fluidized bed of electrically-conductive carbon particles, which bed is heated by the passage of an electric current therethrough, which comprises
   (a) measuring one parameter from the group consisting of bed temperature and bed power consumption, said power consumption being averaged over a period of at least ten seconds and
   (b) adjusting the amount of carbon particles in the bed responsively to deviations of the value of the measured parameter from a desired value, so that the amount of carbon particles in the bed is increased when the value of the measured parameter is below the desired value, and the amount of carbon particles in the bed is decreased when the value of the measured parameter is above the desired value.

2. A method of controlling the temperature of a fluidized bed of electrically conductive carbon particles, which bed is heated by the passage of an electric current therethrough, which comprises
   (a) preliminarily determining the power consumption in the bed, averaged over a period of at least ten seconds, which is associated with a desired temperature value under the conditions of operation of the fluidized bed, then
   (b) measuring the power consumption in the bed, the power consumption being averaged over a period of at least ten seconds, and
   (c) adjusting the amount of carbon particles in the bed responsively to deviations of the measured averaged power consumption of the bed from the averaged power consumption associated with the desired temperature, so that the amount of carbon particles is increased when the averaged power consumption is below the value associated with the desired temperature and the amount of carbon particles is decreased when the averaged power consumption is above the value associated with the desired temperature.

3. A method for controlling the temperature of a fluidized bed of electrically-conductive carbon particles, which bed is heated by the passage of an electric current therethrough, which comprises adjusting the amount of carbon particles in the bed responsively to deviations of the measured temperature from a desired value, so that the amount of carbon particles in the bed is increased when the temperature is below the desired value, and the amount of carbon particles in the bed is decreased when the temperature is above the desired value.

4. A method of controlling the power consumption of a fluidized bed of electrically-conductive carbon particles, which bed is heated by the passage of electric current therethrough, which comprises adjusting the amount of carbon particles in the bed responsively to deviations of the averaged power consumption from a desired value, so that the amount of carbon particles is increased when the averaged power consumption is below the desired value and the amount of carbon particles is decreased when the averaged power consumption is above the desired value, said power consumption being averaged over a period of at least ten seconds.

5. The method of claim 1 wherein the temperature or power consumption is measured continuously.

6. The method of claim 2 in which the measurement of power in step (b) is carried on continuously, and the measured value is continuously averaged over a period of at least thirty seconds.

7. The method of claim 1, in which the adjustment of the amount of carbon particles in the fluidized bed is accomplished by adding particles to and removing particles from the bed, and in which those particles added are of smaller average size than those particles removed.

8. Apparatus for controlling the temperature of a fluidized bed of electrically-conductive carbon particles, which bed is heated by the passage of an electric current therethrough, which comprises
   (a) means for measuring the power consumption in the bed, the power consumption being averaged over a period of at least ten seconds, and
   (b) means for adjusting the amount of carbon particles in the bed responsively to deviations of the measured averaged power consumption of the bed from the averaged power consumption associated with a desired temperature, so that the amount of carbon particles is increased when the averaged power consumption is below the value associated with the desired temperature and the amount of carbon particles is decreased when the averaged power consumption is above the value associated with the desired temperature.

9. Apparatus for controlling the temperature of a fluidized bed of electrically-conductive carbon particles, which bed is heated by the passage of an electric current therethrough, which comprises means for adjusting the amount of carbon particles in the bed responsively to deviations of the temperature of the bed from a desired value, such means operating to increase the amount of carbon particles in the bed when the temperature is below the desired value and operating to decrease the amount of carbon particles in the bed when the temperature is above the desired value.

10. Apparatus for controlling the power consumption of a fluidized bed of electrically-conductive carbon particles, which bed is heated by the passage of electric current therethrough, which comprises means for adjusting the amount of carbon particles in the bed responsively to deviations of the averaged power consumption from a desired value, such means operating to increase the amount of carbon particles when the averaged power consumption is below the desired value and operating to increase the amount of carbon particles when the averaged power consumption is above the desired value, said power consumption being averaged over a period of at least ten seconds.

11. Apparatus for controlling the temperature of a fluidized bed of electrically conductive carbon particles at a desired value, said bed being heated by the passage of an electric current therethrough, which comprises (a) means for removing carbon particles from the bed at a first rate,
(b) means for measuring the power consumption in the bed, the power consumption being averaged over a period of at least ten seconds and
(c) means for adding carbon to the bed at a second rate, one of said rates being substantially fixed and the other one of said rates varying in response to changes in the averaged power consumption in the bed so that the supply of carbon particles introduced into the bed is increased when the averaged power consumption is below the value associated with the desired temperature, and so that the supply of carbon particles introduced into the bed is decreased when the averaged power consumption is above the value associated with the desired temperature.

12. Apparatus as claimed in claim 11, in which the means (a) comprises a pipe adapted to carry fluidizing gas and entrained carbon particles from the reactor.

13. Apparatus as claimed in claim 11, in which the means (a) comprises a pipe adapted to remove carbon particles by gravity from the bottom portion of the fluidized bed.

14. Apparatus as claimed in claim 11, in which the carbon particles added to the bed in step (c) are of smaller average diameter than those removed from the bed in step (a).

15. Apparatus as claimed in claim 11, in which the first rate is a fixed continuous rate and the second rate is a variable intermittent rate.

References Cited by the Examiner

UNITED STATES PATENTS

| | | | |
|---|---|---|---|
| 3,025,385 | 3/1962 | Tanaka | 219—50 |
| 3,032,396 | 5/1962 | Kennedy | 23—151 |
| 3,157,468 | 11/1964 | Kennedy | 23—151 |
| 3,170,763 | 2/1965 | Reid et al. | 23—206 |

RICHARD M. WOOD, *Primary Examiner.*

B. A. STEIN, *Assistant Examiner.*